Figure 1:
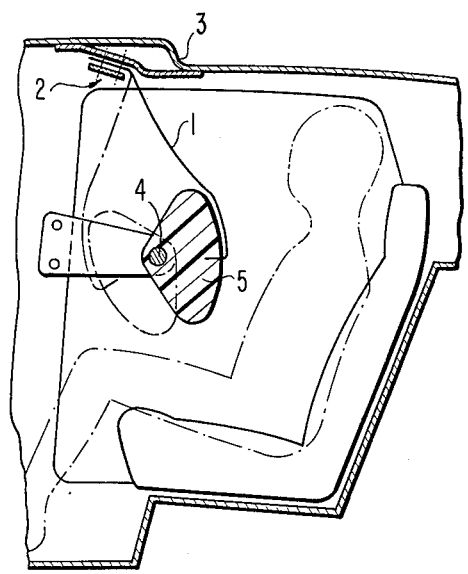

United States Patent [19] [11] 3,909,039
Barényi et al. [45] Sept. 30, 1975

[54] SAFETY INSTALLATION FOR THE PASSENGERS OF VEHICLES, ESPECIALLY OF MOTOR VEHICLES

[75] Inventors: Béla Barényi, Maichingen; Karl Wilfert, Gerlingen-Waldstadt; Hermann Renner, Magstadt, all of Germany

[73] Assignee: Daimler-Benz Aktiengesellschaft, Germany

[22] Filed: Oct. 4, 1973

[21] Appl. No.: 403,533

[30] Foreign Application Priority Data
Oct. 4, 1972 Germany............................ 2248645

[52] U.S. Cl............................ 280/150 B; 280/150 B
[51] Int. Cl.²......................................... B60R 21/02
[58] Field of Search ...................... 280/150 B, 82 C

[56] References Cited
UNITED STATES PATENTS
3,133,746   5/1964   Zazzara........................... 280/150 B
3,494,633   2/1970   Malloy............................ 280/150 B
3,782,756   1/1974   Brown............................. 280/150 B

*Primary Examiner*—Robert R. Song
*Attorney, Agent, or Firm*—Craig & Antonelli

[57] ABSTRACT

A safety installation for the passengers of vehicles, especially of motor vehicles which consists of a retaining mechanism that is brought into its effective position relative to the vehicle passenger in case of an accident; the retaining mechanism is pivotally supported about a vehicle cross axis and is so arranged that in case of an impact by the vehicle passenger against the retaining mechanism, at most only a slight torque about the pivot axis thereof occurs; a catching-net is additionally provided which is secured at the top within the area of the vehicle roof and whose lower area is so arranged that it is brought into its effective position by the pivoting action of the retaining mechanism.

24 Claims, 5 Drawing Figures

SAFETY INSTALLATION FOR THE PASSENGERS OF VEHICLES, ESPECIALLY OF MOTOR VEHICLES

The present invention relates to a safety installation for the passengers of vehicles, especially of motor vehicles, which consists of a retaining installation that is brought in case of an accident into its effective position relative to the vehicle passengers, whereby the retaining installation, which is pivotally supported about a vehicle cross axis by conventional means, is so arranged that in case of an impact of a vehicle passenger against the installation, at most a slight torque about the pivot axis thereof occurs, as disclosed in German Patent Application No. P 22 32 895.6.

The present invention is concerned with the task to so further develop and complete a safety installation of the type described above that also the head of a vehicle passenger is caught and absorbed softly in case of an accident without coming into contact with any parts of the vehicle body or of its internal equipment.

As solution to the underlying problems, it is proposed according to the present invention to provide additionally a catching- or intercepting-net of conventional type which is secured at the top thereof within the area of the vehicle roof and whose lower area is so arranged that it is brought into its effective position by the pivoting action of the retaining installation.

The lower end of the catching-net can thereby be secured at the pivotal retaining installation itself or, surrounding the retaining installation, at the support arrangement thereof or at adjacent parts fixed at the vehicle, or both ends of the catching-net, which in this case also surrounds the retaining installation, may be secured in the roof area.

Furthermore, the upper and/or lower end of the catching-net may be connected with an automatically operating wind-up mechanism for the catching-net.

Accordingly, it is an object of the present invention to provide a safety installation for the passengers of vehicles, especially of motor vehicles, which avoids by simple means the aforementioned shortcomings and drawbacks encountered in the prior art.

Another object of the present invention resides in a safety installation for the passengers of vehicles, especially of motor vehicles, which assures that the head of a vehicle passenger is also softly absorbed in case of an accident.

A still further object of the present invention resides in a safety installation for the passengers of vehicles which assures that the head of a passenger does not come into contact with any hard parts of the vehicle body or its inner equipment during an accident, especially during a front end collison.

Another object of the present invention resides in a safety installation of the type described above which is simple in construction, involves relatively low expenditures and is easy to install, yet is highly reliable and effective in operation.

Figure 3:
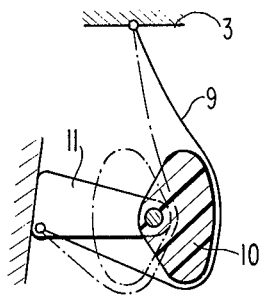
Figure 4:
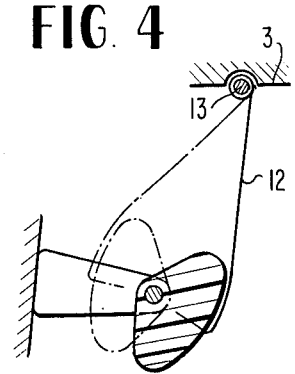
Figure 2:
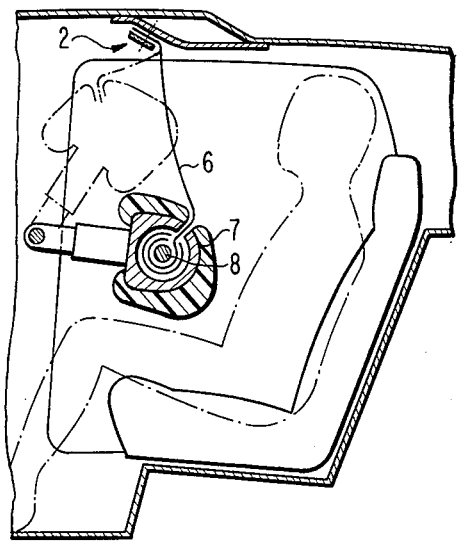
Figure 5:
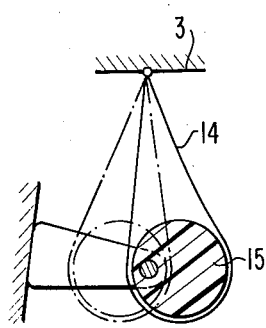

These and further objects, features, and advantages of the present invention will become more apparent from the following description when taken in connection with the accompanying drawing which shows, for purposes of illustration only, several embodiments in accordance with the present invention, and wherein:

FIGS. 1 and 2 are two schematic cross-sectional views through the rear seating area of a motor vehicle equipped with two different constructions of safety installations according to the present invention; and FIGS. 3 to 5 are partial schematic views illustrating three further modified embodiments of safety installations in accordance with the present invention, as viewed in side view.

Referring now to the drawing wherein like reference numerals are used throughout the various views to designate like parts, it should be mentioned beforehand in connection with the safety installation illustrated in the drawing that the retaining installation and catching-net are illustrated in FIGS. 1 to 5 in their effective position always in full lines and in their normal rest position in dash lines.

Referring now to the illustration of FIG. 1, the catching- or intercepting-net 1 is secured with its upper end at 2 within the area of the vehicle roof 3 and with its lower end at a padded retaining installation 5 pivotal about a shaft 4. Upon exceeding a predetermined vehicle deceleration or, for example, in dependence on the position of the ignition key, the retaining mechanism 5 and therewith also the catching-net 1 is pivoted out of its normal rest position (shown in dash lines) into its effective position, for example, by means of a prestressed spring (not shown).

In the embodiment of the present invention illustrated in FIG. 2, the catching-net 6 is also secured with its upper end at 2 within the roof area, however, its lower end is operatively connected with an automatically operating wind-up mechanism 8 arranged on the inside of the retaining installation 7. Since the wind-up mechanism 8 is of conventional type, a detailed description thereof is dispensed with herein.

A modification of the present invention is illustrated in FIG. 3 in which the upper end of the catching-net 9 is also secured at the roof 3. This catching-net 9 surrounds, however, the pivotal retaining installation 10 and its lower end is secured at a support arrangement 11 of the retaining installation 10.

The modified embodiment according to FIG. 4 corresponds far-reachingly to that of FIG. 1, however, in this embodiment, the upper end of the catching-net 12 terminates in this embodiment in a wind-up mechanism 13 of conventional type which is secured at the roof 3.

Finally, in the embodiment according to FIG. 5, the catching-net 14 surrounds the retaining installation 15 and both ends of the catching-net 14 are secured at the roof 3.

Even though the torque exerted on the retaining installation may slightly increase under certain circumstances by the arrangement of a catching- or intercepting-net according to the present invention, this, however, can be readily accepted in the interest of an increased safety of the vehicle passengers.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A safety installation for vehicle passengers comprising in combination impact means arranged in spaced relationship in front of a vehicle passenger for absorbing impact of the passenger during an accident, said impact means being pivotally mounted about a vehicle cross axis to absorb said impact with only slight torque of said impact means about said cross axis such that only minimal pivot motion of said impact means occurs upon impact, and catching-net means for additionally retaining said passenger, said catching-net means having an upper end secured within the area of the vehicle roof and having a lower end arranged such that said impact means brings said catching net means into an effective position in front of said passenger, wherein said impact means are pivotally supported about said vehicle cross axis to be pivoted into position in front of said passenger during said accident, said catching net means being brought into said effective position by the pivoting of said impact means into position in front of said passenger.

2. A safety installation according to claim 1, characterized in that the lower end of the catching-net means is secured at the impact means.

3. A safety installation according to claim 2, characterized in that both the upper and lower ends of the catching-net means are connected with an automatically operating wind-up mechanism.

4. A safety installation according to claim 2, characterized in that the lower end of the catching-net means is operatively connected with an automatically operating wind-up mechanism.

5. A safety installation according to claim 4, wherein said automatic wind-up mechanism is arranged on the inside of said impact means.

6. A safety installation according to claim 1, characterized in that the lower end of the catching-net means surrounds the impact means.

7. A safety installation according to claim 6, characterized in that the lower end of the catching-net means is secured at a support means for the impact means.

8. A safety installation according to claim 6, characterized in that the lower end of the catching-net means is secured at adjacent fixed vehicle parts.

9. A safety installation according to claim 6, characterized in that both the upper and lower ends of the catching-net means are connected with an automatically operating wind-up mechanism.

10. A safety installation according to claim 1, characterized in that the catching-net means surrounds the impact means and in that its two ends are secured in the roof area.

11. A safety installation according to claim 1, characterized in that at least one of the upper and lower ends of the catching-net means is operatively connected with an automatically operating wind-up mechanism.

12. A safety installation according to claim 11, characterized in that the lower end of the catching-net means is secured at the impact means.

13. A safety installation according to claim 12, characterized in that the lower end of the catching-net means is operatively connected with an automatically operating wind-up mechanism.

14. A safety installation according to claim 13, wherein said automatic wind-up mechanism is arranged on the inside of said impact means.

15. A safety installation according to claim 11, characterized in that the lower end of the catching-net means surrounds the impact means.

16. A safety installation according to claim 15, characterized in that the lower end of the catching-net means is secured at a support means for the impact means.

17. A safety installation according to claim 15, characterized in that the lower end of the catching-net means is secured at adjacent fixed vehicle parts.

18. A safety installation according to claim 11, characterized in that the catching-net means surrounds the impact means and in that its two ends are secured in the roof area.

19. A safety installation according to claim 1, characterized in that both the upper and lower ends of the catching-net means are connected with an automatically operating wind-up mechanism.

20. A safety installation according to claim 1, characterized in that the lower end of the catching-net means is operatively connected with an automatically operating wind-up mechanism.

21. A safety installation according to claim 20, wherein said automatic wind-up mechanism is arranged on the inside of said impact means.

22. A safety installation according to claim 11, characterized in that the lower end of the catching-net means is operatively connected with an automatically operating wind-up mechanism.

23. A safety installation according to claim 22, wherein said automatic wind-up mechanism is arranged on the inside of said impact means.

24. A safety installation according to claim 1, wherein said impact means are padded.

* * * * *